(12) United States Patent
Sato

(10) Patent No.: US 6,516,001 B1
(45) Date of Patent: Feb. 4, 2003

(54) DEVICE FOR CONVERTING SONET DATA INPUT INTO DS-N DATA OUTPUT

(75) Inventor: Akihiko Sato, Miyagi (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/326,005

(22) Filed: Jun. 4, 1999

(30) Foreign Application Priority Data

Jun. 5, 1998 (JP) ............................................ 10-172104

(51) Int. Cl.[7] .................................................. H04J 3/16
(52) U.S. Cl. ...................................... 370/466; 370/502
(58) Field of Search ................................ 370/304, 324, 370/350, 503, 391, 507, 509, 510, 511, 512, 513, 514, 520, 466, 467

(56) References Cited

U.S. PATENT DOCUMENTS

| 4,928,275 A | * | 5/1990 | Moore et al. | ............... 370/506 |
| 5,311,511 A | * | 5/1994 | Reilly et al. | ............... 370/516 |
| 5,390,180 A | * | 2/1995 | Reilly | ......................... 370/476 |

FOREIGN PATENT DOCUMENTS

| JP | 3-120131 | 12/1991 |
| JP | 4-280514 | 10/1992 |
| JP | 5-175930 | 7/1993 |
| JP | 5-210429 | 8/1993 |
| JP | 6-133187 | 5/1994 |

OTHER PUBLICATIONS

Japanese Office Action issued Feb. 26, 1999 in a related application and English–language translation of relevant portions.

* cited by examiner

*Primary Examiner*—Wellington Chin
*Assistant Examiner*—Brenda Pham
(74) *Attorney, Agent, or Firm*—Dickstein, Shapiro, Morin & Oshinsky, LLP.

(57) ABSTRACT

A device for converting SONET (synchronous optical network) data input into DS-N data output asynchronous to SONET, having: a write address counter that generates a write address used to write SONET data input into a data buffer based on a SONET clock synchronous to SONET; a read address counter that generates a read address used to read DS-N data output from the data buffer; a buffer offset register that a difference between a delay value of the read address counter to the write address counter and a predetermined value is set; and a feedback controller that the content of the buffer offset register is input as an error signal and controls the frequency of a clock for the read address counter based on the error signal. The feedback controller has a calculator for calculating a primary control signal as a function of the error signal from the error signal, a ROM or calculator for generating a frequency control signal that is a nonlinear function of the primary control signal, and a controller for controlling the frequency of the clock for the read address counter using the frequency control signal.

9 Claims, 7 Drawing Sheets

DEVICE FOR CONVERTING SONET DATA INPUT INTO DS-N DATA OUTPUT

FIELD OF THE INVENTION

This invention relates to a device for obtaining a DS-N data output asynchronous to SONET (synchronous optical network) from SONET data input.

BACKGROUND OF THE INVENTION

Since the transmission rate of SONET is on the basis of 51.84 Mbps and the transmission rate of DS-N is on the basis of 64 kbps, they are numerically in integer-fold relation to each other. However, since the respective clock frequencies incur errors, SONET data become asynchronous to DS-N data. Therefore, to obtain a DS-N data output from SONET data input, a special device is required.

Japanese patent application laid-open No. 6-204962 (1994) (hereinafter referred to as 'prior art 1') discloses a device and a method for desynchronizing SONET to DS-N signal.

FIG. 1 is a block diagram showing the circuit composition of the device in prior art 1. SONET data input is written into a data buffer 1 and is then output as DS-N data output from the data buffer 1.

A write address (WADR) to determine the write position of SONET data in the data buffer 1 is supplied from a write address counter 2 that counts SONET clock.

An address position to read DS-N data from the data buffer 1 is supplied from a read address counter 3.

SONET data input is sequentially written into a position indicated by the write address counter 2, and after delaying a proper time, a count value of the read address counter 3 corresponds to a previous count value of the write address counter 2, thereby data written previously is read sequentially.

The preferable amount of delay of the count value of the read address counter 3 to the count value of the write address counter 2 is half of the whole amount of addresses.

With such a setting, both a risk that the count value of the read address counter 3 is so advanced that it passes the count value of the write address counter 2 and a risk that the count value of the read address counter 3 is so delayed that it is passed by the count value of the write address counter 2 (taking a round within all addresses) can be made minimum.

To keep such a relationship, the frequency of clock DSCLK counted by the read address counter 3 is feedback-controlled.

A deviation of delay of the count value of the read address counter 3 to the count value of the write address counter 2 from the preferable amount is stored into a buffer offset register 4, as an offset value. This value is updated by every timing pulse UPDATE generated by a control loop timer 5. A micro-controller 6 is fed with the content (OFFSET) of the buffer offset register 4 as an error signal, and then generates a frequency adjusting (control) signal from this error signal.

FIG. 2 is a block diagram showing calculations in the micro-controller 6, where 60, 63 and 64 are multipliers, 65 is an adder, 61 is an integration circuit and 62 is a differential circuit.

In so-called PDI control that an error signal e(nt) is input from the buffer offset register 4 and then a frequency adjusting (control) signal m(nt) is output to a DDS (direct digital synthesizer) circuit 7, m(nt) is given by:

$$m(nt) = K_P e(nt) + K_I \int e(nt) dt + K_D de(nt)/dt \quad (1)$$

where the integration part and differential part are placed to enhance the control characteristic and $K_D=0$, $K_I=0$ or $K_D=K_I=0$ may be set. In prior art 1, the fuzzy control can be also employed.

FIG. 3 is a block diagram showing the composition of the DDS circuit 7. In FIG. 3, 70a is a center frequency register, 70b is an adder, 71a is an adder, 71b is an accumulator, 72 is a look-up table ROM (read-only memory), 73 is DAC (digital-to-analog converter) and 74 is LPF (low-pass filter).

The error signal e(nt) can have a positive or negative value, therefore the frequency control signal m(nt) can have a positive or negative value. However, it is necessary for the DDS circuit 7 to avoid that an accumulated value by the adder 71a and accumulator 71b becomes negative. With the center frequency register 70a and the adder 70a, if the value of frequency control signal is 0, then the DDS circuit generates the center frequency.

When the value of frequency control signal is positive, the DDS circuit generates a frequency higher than the center frequency, and when the value of frequency control signal is negative, the DDS circuit generates a frequency lower than the center frequency.

Namely, the content of the center frequency register 70a and the value of frequency control signal are added by the adder 70b, and then a sine wave with a frequency proportional to the output of the adder 70b (the content of the center frequency register 70a is determined so that this output always becomes positive) is generated.

Provided that the accumulator 71b is modulo-N, the content of the accumulator 71b is an integer value of 0, 1, 2, ..., j, ..., N−1, and increases by the output value of the adder 70b every time DDS reference clock generates.

The look-up table ROM 72 stores a value of $\sin 2\pi j/N$, as data, at the address position corresponding to output j of the accumulator 71b. Therefore, the output of ROM 72 is formed into a sine wave and its frequency is proportional to the output of the adder 70b. This is converted into analog signal by DAC 73, smoothed by LPF 74, output as clock CLK1.

Referring back to FIG. 1, clock CLK1 is frequency-mixed (in this case, an added frequency is extracted) by the output frequency of a local oscillator 11 and a double-balanced mixer 10. Then, through a bandpass filter 9 and a logic level converter 12, it is counted by the read address counter 3, as clock DSCLK for the read address counter 3.

By the feedback circuit described above, the difference between WADR and RADR is kept at a given value.

FIG. 4 is a flow chart showing the steps of operation described above. At step 101 the components are initialized, at step 102 waiting for a firmware to come to 'online mode', at step 103 setting the initial frequency. For example, the value of frequency control signal is set 0.

At step 104 the interrupt is allowed, at step 105 waiting for the control loop timer to interrupt with UPDATE signal.

When the interrupt occurs, the buffer offset register 4 is read (step 106A). At this time, it is checked whether a spill occurs or not (step 106B).

The spill means generalizing a case that the count value of the read address counter 3 is so advanced that it passes the count value of the write address counter 2 and a case that the count value of the read address counter 3 is so delayed that it is passed by the count value of the write address counter 2 (taking a round within all addresses).

When the spill occurs, the buffer offset register 4 is reset (step 106C), returned to step 105.

When the spill does not occur, at step 107 the average offset and average slope are calculated newly. The calculation of average offset is the operation of the integration circuit 61 in FIG. 2, and the calculation of average slope is the operation of the differential circuit 62 in FIG. 2.

Then, step 108 conducting the calculation of expression (1) described above, at step 109 sending a newly calculated frequency control signal to DDS, returning to step 105, waiting for the next interrupt.

The device in prior art 1 is thus composed, and when generating a frequency control signal m(nt) from an error signal e(nt), the frequency control signal m(nt) is determined uniformly calculating expression (1) without taking the largeness of absolute value of e(nt) into account. Therefore, when e(nt) is varied abruptly, there occurs a problem that time required until the frequency of clock DSCLK reaches a final value becomes too long. Since e(nt) is varied abruptly when switching DS-N, this problem is serious.

SUMMARY OF THE INVENTION

Accordingly, it is an object of the invention to provide a device for converting SONET data input into DS-N data output asynchronous to SONET that can reduce quickly the time required until the frequency of clock DSCLK reaches a final value even when error signal is varied abruptly.

According to the invention, a device for converting SONET (synchronous optical network) data input into DS-N data output asynchronous to SONET, comprises:
- a write address counter that generates a write address used to write SONET data input into a data buffer based on a SONET clock synchronous to SONET;
- a read address counter that generates a read address used to read DS-N data output from the data buffer;
- a buffer offset register that an error amount between a delay value of the count value of the read address counter to the count value of the write address counter and a predetermined value is set; and
- a controller wherein the content of the buffer offset register is input as an error signal and controls the frequency of a clock for the read address counter based on the error signal;
- wherein the controller is composed of calculating circuitry for calculating a primary control signal as a function of the error signal, a characteristic conversion ROM for generating a frequency control signal that is a nonlinear function of the primary control signal, and a control circuit for controlling the frequency of the clock for the read address counter using the frequency control signal.

BRIEF DESCRIPTION OF THE DRAWINGS

The invention will be explained in more detail in conjunction with the appended drawings, wherein.

DESCRIPTION OF THE PREFERRED EMBODIMENTS

The preferred embodiments of the invention will be explained below.

Figure 1:
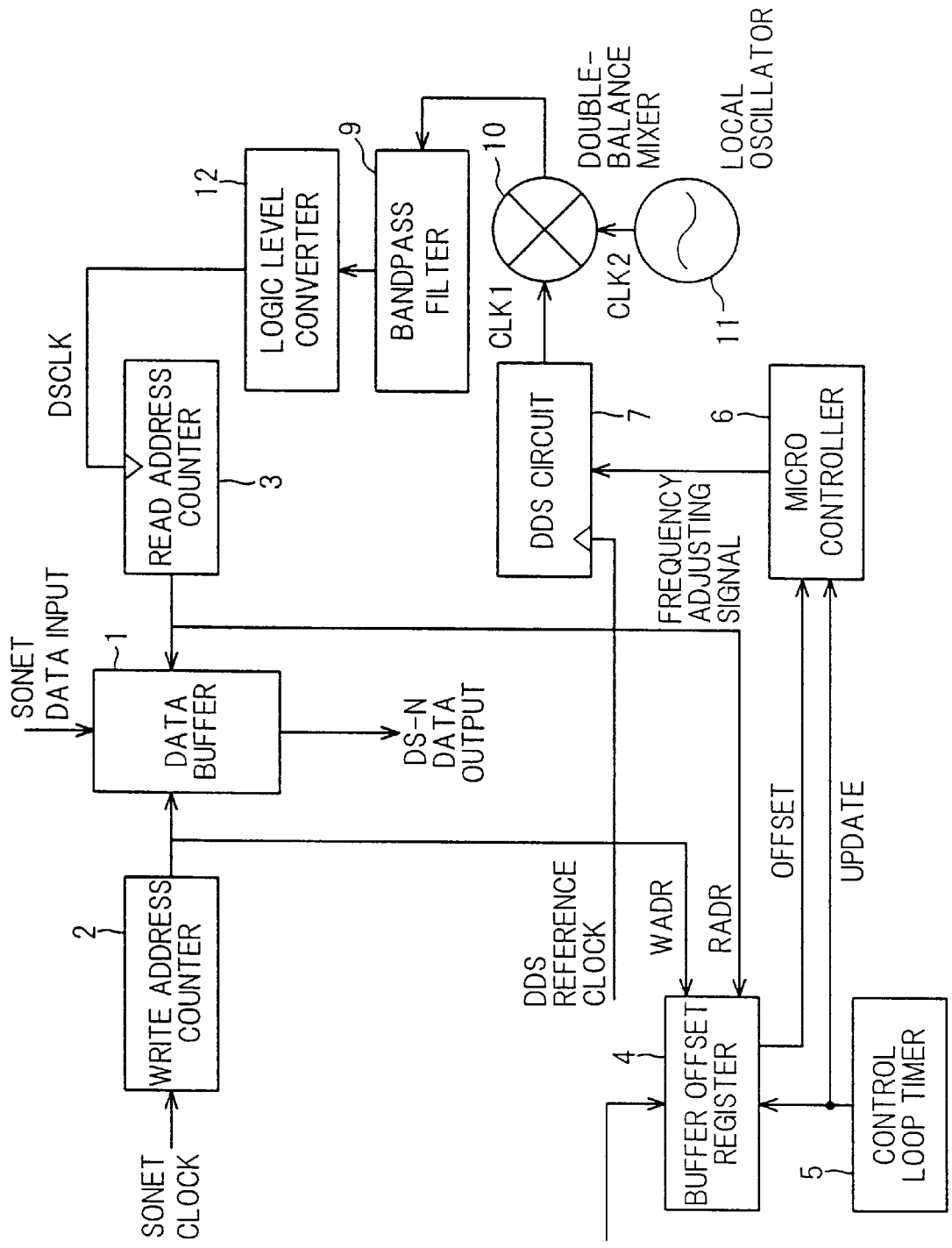
FIG. 1 is a block diagram showing the device in prior art 1.

A device according to this invention can be composed only by altering the micro-controller 6 in FIG. 1, which shows the device in prior art 1.

Figure 2:
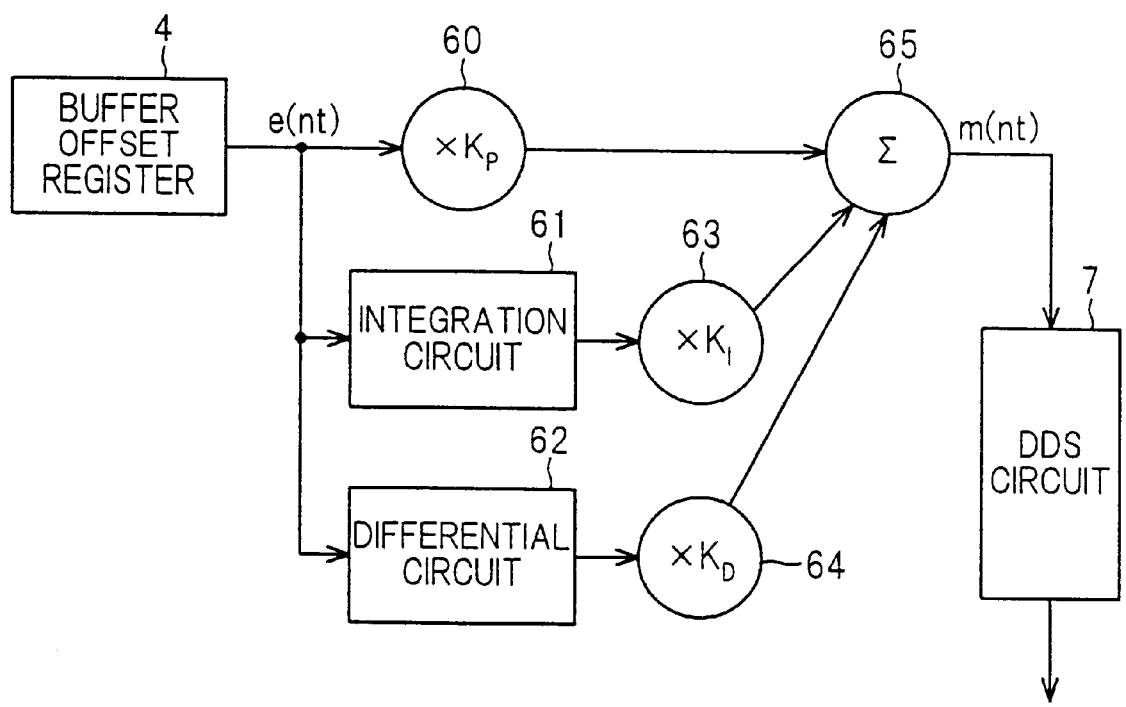
FIG. 2 is a block diagram showing the composition of the micro-controller in FIG. 1.
Figure 3:
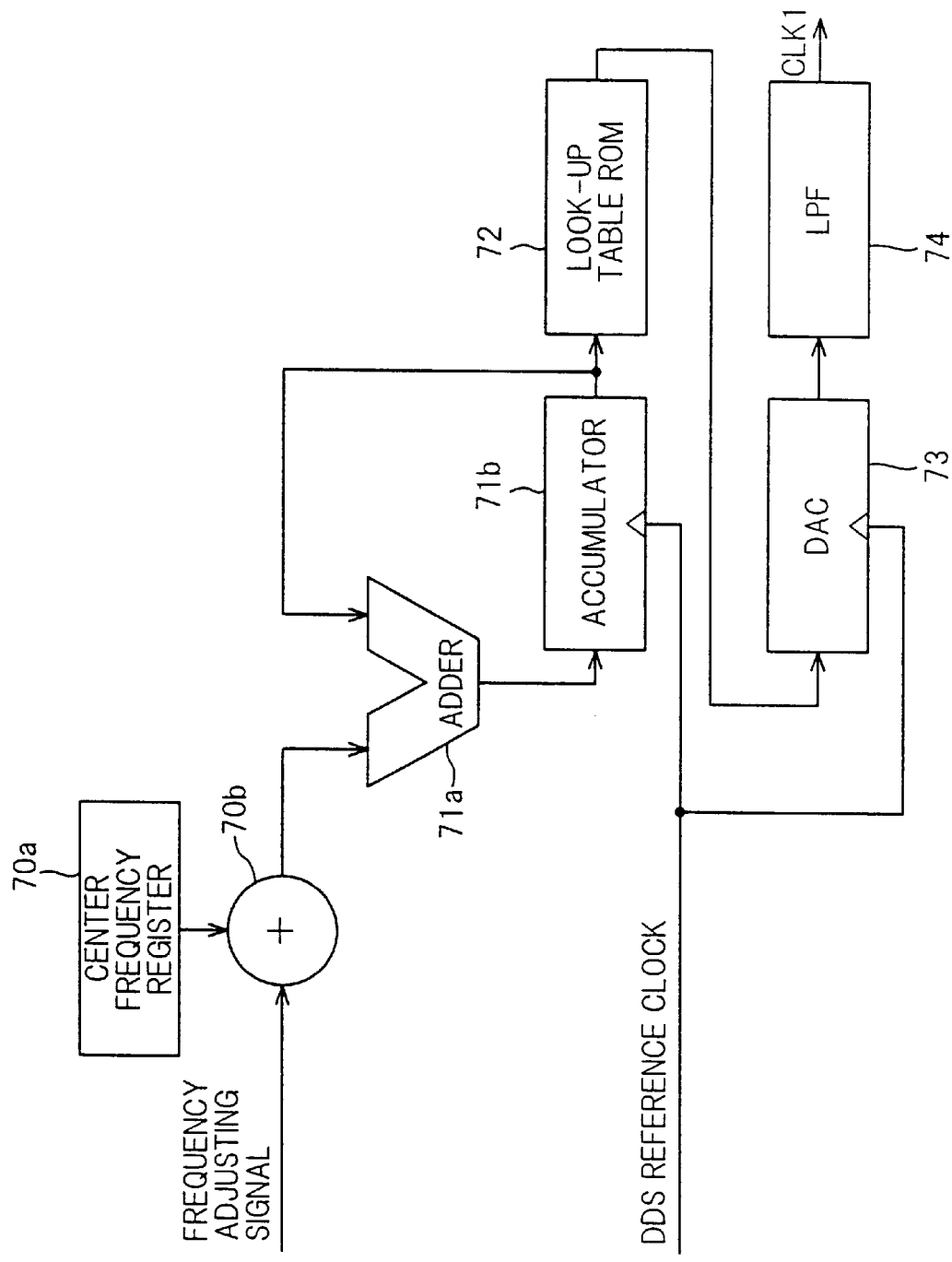
FIG. 3 is a block diagram showing the composition of the DDS circuit in FIG. 1.
Figure 5:
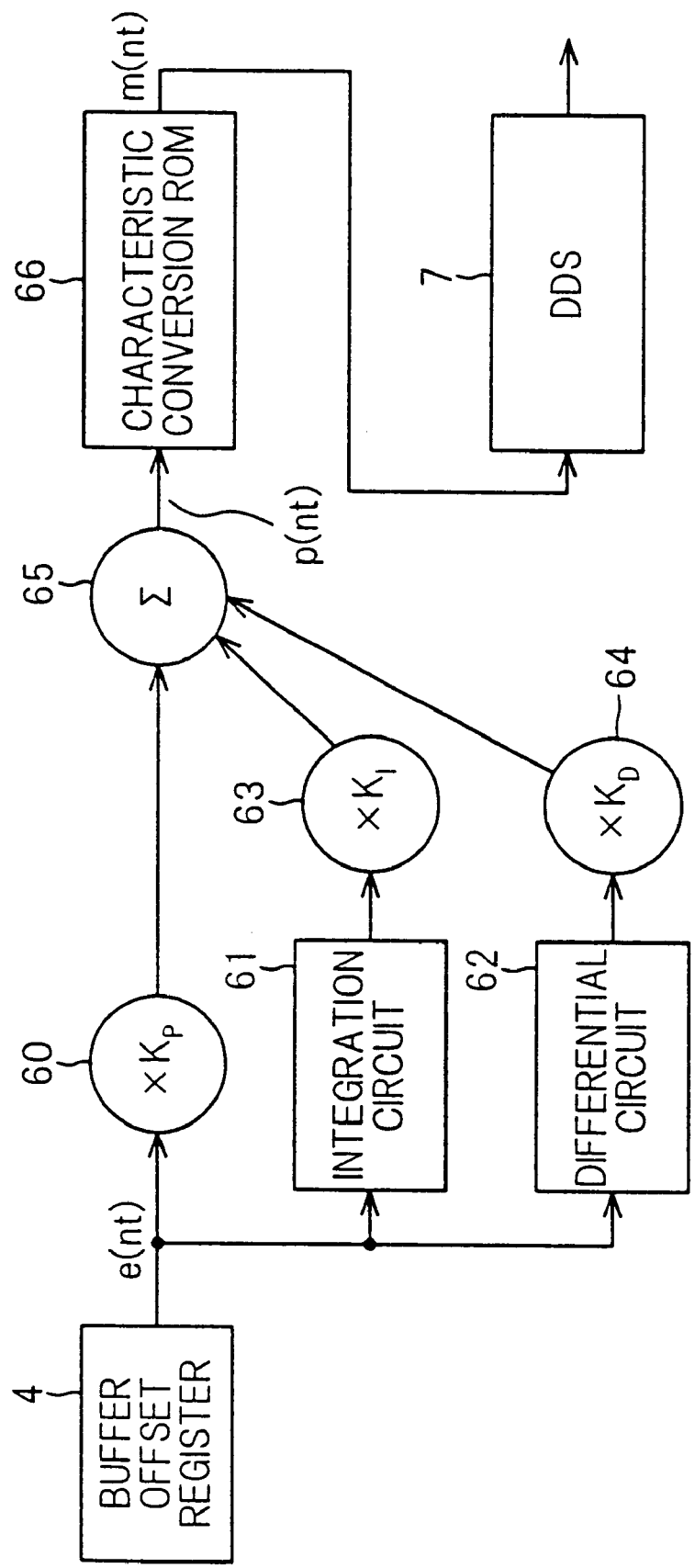
FIG. 5 is a block diagram showing a micro-controller of the device in a first preferred embodiment according to the invention.

FIG. 5 is a block diagram showing a micro-controller 6 in the first preferred embodiment according to the invention. In FIG. 5, like parts are indicated by like reference numerals as used in FIG. 2, and 66 is a characteristic conversion ROM.

Meanwhile, the output of the adder 65, which corresponds to the frequency control signal m(nt), is represented by p(nt) as primary control signal. When the characteristic conversion ROM 66 is read using this primary control signal p(nt) as an address signal, the frequency control signal m(nt) in this invention is obtained.

Figure 6A:
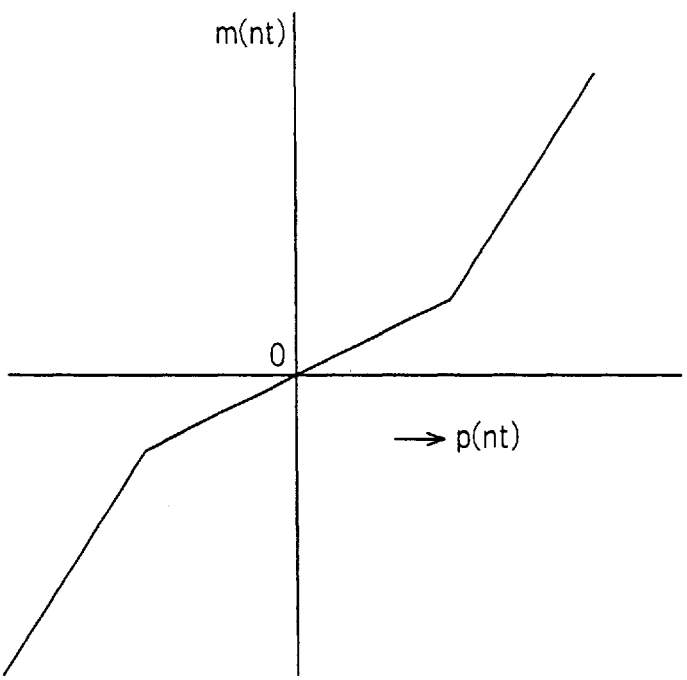
FIGS. 6A and 6B are graphs showing the input-output characteristics of a characteristic conversion ROM in FIG. 5.
Figure 6B:
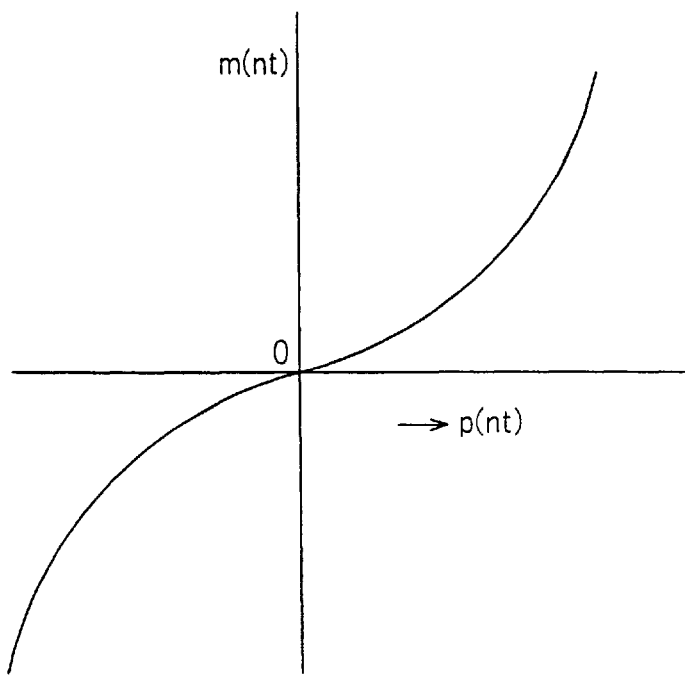

FIGS. 6A and 6B are graphs showing examples of input-output characteristic of the characteristic conversion ROM 66. In FIG. 6A, the characteristic of output (frequency control signal m(nt)) to input (primary control signal p(nt)) is represented by connections of lines. The slope (to the horizontal axis) of line increases in a region where the absolute value of input is large.

In FIG. 6B, the characteristic of output to input is represented by curves. Also in this example, the slope of curves increases in a region where the absolute value of input is large.

When error signal e(nt) is large, the primary control signal p(nt) also becomes large. However, since the enlargement rate of primary control signal p(nt) is also large, the frequency control signal m(nt) becomes doubly large so as to quickly reduce the error signal e(nt) into 0.

The input-output characteristic of the characteristic conversion ROM 66 can be determined into the most preferable one based on experimental results etc. Alternatively, multiple characteristic conversion ROMs that have input-output characteristics different from each other and a selector used to select one ROM from the multiple ROMs may be provided.

Figure 7:
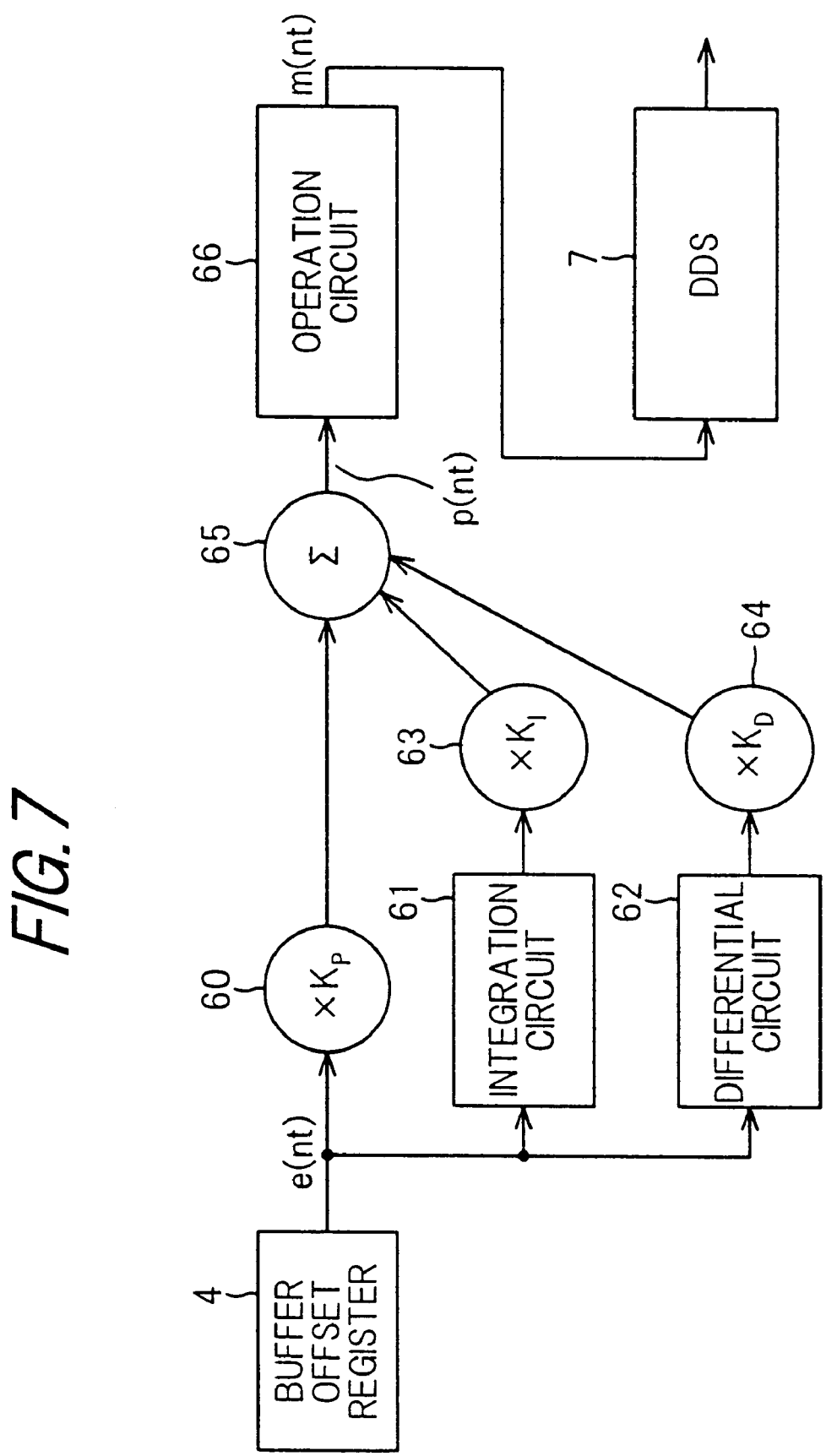
FIG. 7 is a block diagram showing a micro-controller of the device in a second preferred embodiment according to the invention.

FIG. 7 is a block diagram showing a micro-controller 6 in the second preferred embodiment according to the invention. In FIG. 7, like parts are indicated by like reference numerals as used in FIG. 5. Since they operate similarly, their explanations are omitted herein.

In FIG. 7, provided in place of the characteristic conversion ROM 66 is an operation circuit 67 that calculates the frequency control signal m(nt) (hereinafter referred to as 'y') as output from the primary control signal p(nt) (hereinafter referred to as 'x') as input.

For example, to obtain the characteristic shown in FIG. 6B, in a region of $-c<x<+c$, y is determined by $y=dx$ (c and d are positive coefficients). In a region of $c<x$, y is determined by $y=e(x-c)+dc$ (e is a positive coefficient), and in a region of $x<-c$, y is determined by $y=e(x-c)-dc$, where $e>d$ is given.

Also, to obtain the characteristic shown in FIG. 6A, in a region of $x>0$, y is determined by $y=ax+bx^2$, and in a region of $x<0$, y is determined by $y=ax-bx^2$.

The difference between the device of this invention and the device in prior art 1 is only about the micro-controller.

Therefore, the other components of the device in prior art 1 can be used unalteredly as the corresponding components of the device in this invention or the components of known devices can be also used as those. Their explanations are omitted herein.

Figure 4:
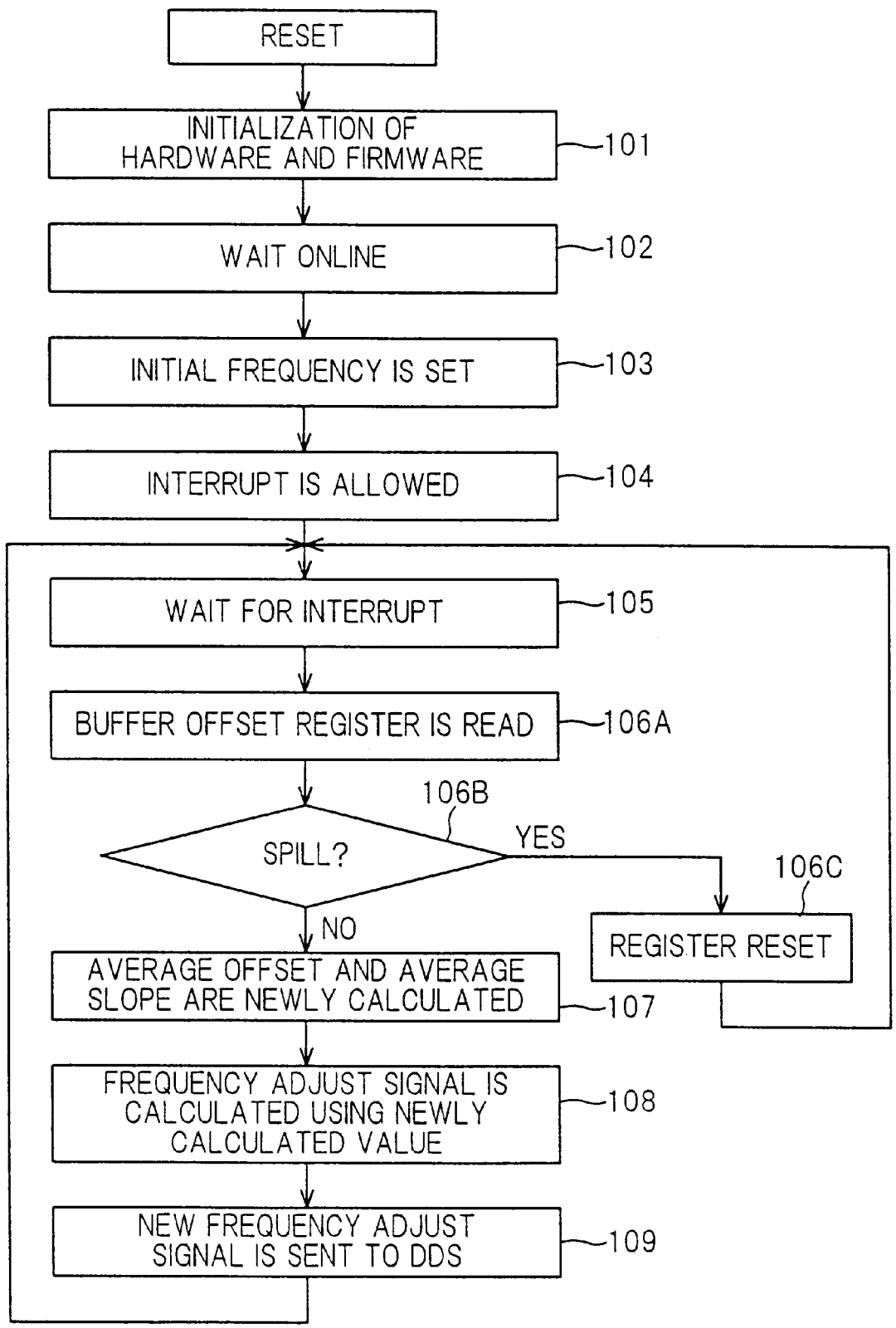
FIG. 4 is a flow chart showing the operation steps of the device in FIG. 1.

Also, the operation steps in the device of this invention are similar to those in the device of prior art 1 described in FIG. 4.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A device for converting SONET (synchronous optical network) data input into DS-N data output asynchronous to SONET, comprising:

a write address counter that generates a write address used to write said SONET data input into a data buffer based on a SONET clock synchronous to SONET;

a read address counter that generates a read address used to read said DS-N data output from said data buffer;

a buffer offset register wherein an error amount between a delay value of a count value of a said read address counter to a count value of said write address counter and a predetermined value is set; and a controller wherein the content of said buffer offset register is input as an error signal and said controller controls the frequency of a clock for said read address counter based on the error signal;

wherein said controller comprises a calculating circuit, said calculating circuit calculating a primary control signal as a function of the error signal, a characteristic conversion ROM for generating a frequency control signal that is a nonlinear function of the primary control signal, and a control circuit, said control circuit controlling the frequency of said clock for said read address counter using the frequency control signal.

2. A device according to claim 1, wherein:
said characteristic conversion ROM is stored at an address position whose address signal is given by a primary control signal.

3. A device according to claim 1, wherein:
the characteristic of said frequency control signal to said primary control signal in said characteristic conversion ROM is represented by the connection of lines with different slopes.

4. A device according to claim 3, wherein:
the slope of said lines is large in a region where the absolute value of the primary control signal is large.

5. A device according to claim 2, wherein:
the characteristic of said frequency control signal to said primary control signal in said characteristic conversion ROM is represented by a curve.

6. A device according to claim 5, wherein:
the characteristic said frequency control signal to said primary control signal in said characteristic conversion ROM is represented by a curve given by $y=ax+bx^3$ in a region of $x>0$ and a curve given by $y=ax-bx^2$ in a region of $x<0$, where x is an input signal, y is an output signal and a, b are positive coefficients.

7. A device according to claim 3, wherein:
said controller is composed of multiple characteristic conversion ROMs with different characteristics and a selector used to select one of said multiple characteristic conversion ROMs.

8. A device according to claim 1, wherein:
said characteristic conversion ROM calculates a frequency control signal y by operating $y=ax+bx^2$ in a region of $x>0$ and by operating $y=ax-bx^2$ in a region of $x<0$, where x is a primary control signal and a, b are positive coefficients.

9. A device according to claim 1, wherein:
said characteristic conversion ROM calculates a frequency control signal y by operating $y=dx$ in a region of $-c<x<+c$, by operating $y=e(x-c)+dc$ in a region of $x<x$, and by operating $y=e(x-c)-dc$ in a region of $x<-c$, where c, d and e are positive coefficients and $e>d$ is satisfied.

* * * * *